Dec. 24, 1968     J. M. DENNIS ET AL     3,418,138
APPARATUS FOR AND METHODS OF TREATING BIVALVES
Filed Jan. 7, 1965
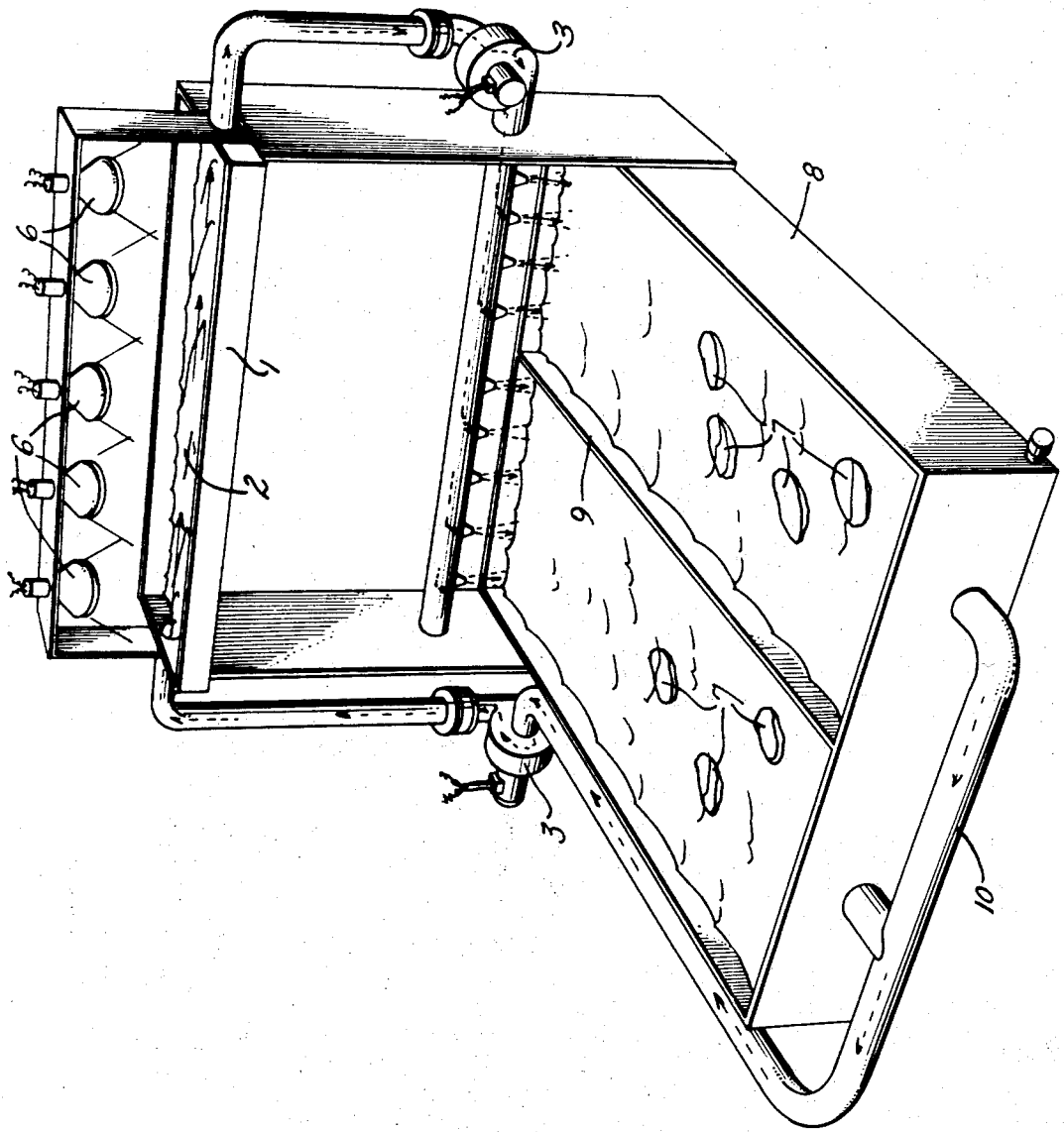
INVENTORS

United States Patent Office 3,418,138
Patented Dec. 24, 1968

3,418,138
APPARATUS FOR AND METHODS OF TREATING BIVALVES
John M. Dennis, Essex Farms, Royal Oak, Md. 21662, and Michael Rossnan, 11724 Lovejoy St., Silver Spring, Md. 20902
Filed Jan. 7, 1965, Ser. No. 424,093
6 Claims. (Cl. 99—158)

Our present invention relates to improvements in apparatus for and methods of treating bivalves, especially oysters and clams, one object of the invention being the provision of a method of treatment of oysters taken from polluted waters that restores the oysters to a normal or even better edible condition than when normal oysters have been tonged or dredged from their beds.

Another object of the invention is the provision of apparatus for treating oysters tonged or dredged from polluted waters, so that such oysters can be treated and restored to natural edible condition.

In order that the invention may be fully and clearly understood, attention is invited to the accompanying drawing in which a diagrammatical view is shown of the complete apparatus for restoring normalcy to oysters taken from polluted waters.

Referring to the drawing, the numeral 1 designates a shallow rectangular water conducting open trough or tank, through which a very shallow sheet 2 of normal sea or simulated sea water is directed, by any means such as a deliverer or rotary pump 3, there being ultraviolet lamps 6 placed thereabove to act on this flowing sheet of water, to allow this treated water to cover and act upon the oysters 7 that have been taken from polluted water. This ultraviolet ray treated salt water after a determined period of time, from 1 hour to 336 hours is sufficient to restore the natural health and even better flavor to such treated oysters. Tank 8, containing the sea water and oysters is divided into two compartments by the partition 9. To provide the necessary circulation of the sea water the conduit 10, is in communication with both compartments of the tank and circulation is assured by the rotary pumps.

There are various scopes within which this method may be practiced, that is, the temperature of the treated water or to be treated water. This is between 34° and 90° F., and also the depth of the water being treated in the sluiceway or chute, that is from approximately $\frac{1}{16}$ of an inch deep to 12 inches, and the gallon per minute flow of the treated water. This may vary from one gallon per minute to 50 gallons per minute.

The bivalve when taken from the polluted sea water, is first placed in a bath of ultraviolet treated simulated sea water, or the natural sea water normally found where bivalves are dug, tonged or dredged for. Then this bath is directly under the outlet of the sluiceway, so that the water that has been ultraviolet ray treated, flows onto and in the water with the bivalves, preferably oysters, and this treatment goes on for 1 hour to 336 hours, or may vary in accordance with the amount of pollution that was in the water from which the oysters were tonged or dredged, but when they have been restored to healthy condition, this being determined by shucking and testing oysters at stated intervals. The oyster thus treated, when the same is restored to a healthy condition, in many cases has a better appearance and even better flavor than the oysters tonged or dredged from nonpolluted waters.

Clams taken from sand and water that is polluted, are treated similarly to the oysters, as above set forth.

From the foregoing description, when taken with the drawing, it is evident that this ultraviolet ray treatment of normal salt water, sea water, will restore the bivalves that have suffered from polluted water, to normal, or even better, condition, so that such bivalves, particularly oysters from such polluted water, by this method instead of being condemned as unfit for food, can be so treated as to be restored to edible condition.

What is claimed is:
1. The method of treating tainted bivalves comprising submerging the tainted bivalves in a tank containing continuously moving ultra-violet ray treated salt water, the depth of which varies from $\frac{1}{16}$ of an inch to 12 inches in the sluiceway, for from 1 hour to 336 hours at water temperatures of 34° to 90° F., and causing the water to circulate during this period while subjecting said treated salt water to artificial ultra-violet light.
2. The treatment as claimed in claim 1, wherein the bivalves are oysters.
3. An apparatus for the ultraviolet ray treatment of bivalves, including in combination a rectangular open tank, a rig hanged inverted U-shaped frame at one end of the tank, ultra-violet lamps carried by the spanning portion of this member, and a water circulating system including a rotary circulator, and conduits leading from the same to the end of the tank remote from the lamp supporting member to a nippled pipe at the end of the tank remote from the water entrance, to cause circulated water in the tank.
4. Method as set forth in claim 1 wherein the water is simulated sea water.
5. Method as set forth in claim 1 wherein the bivalves are clams.
6. Method as set forth in claim 1 wherein the bivalves are oysters.

References Cited
UNITED STATES PATENTS
| | | | |
|---|---|---|---|
| 1,945,102 | 1/1934 | Tranin et al. | 99—218 |
| 2,302,336 | 11/1942 | MacDonald | 119—2 |
| 2,482,507 | 9/1949 | Rentschler et al. | 99—218 |
| 3,116,712 | 1/1964 | Ogden et al. | 119—3 |

OTHER REFERENCES
Stansby, M. E.: Industrial Fishery Technology, 1963, p. 188.

LIONEL M. SHAPIRO, Primary Examiner.

U.S. Cl. X.R.
99—218; 21—54, 102; 119—4